Patented Mar. 24, 1931

1,797,928

UNITED STATES PATENT OFFICE

STANLEY ROBSON, OF AVONMOUTH, AND BERTRAM LAMBERT, OF PARK TOWN, ENGLAND

MANUFACTURE OF SULPHURIC ACID

No Drawing. Application filed September 20, 1928, Serial No. 307,327, and in Great Britain October 3, 1927.

This invention relates to the manufacture of sulphuric acid by the contact process, which has hitherto been complicated by the elaborate precautions which have had to be taken to purify the sulphurous roaster gases from dust, arsenic and chlorine compounds and other materials whose presence in the gases would rapidly reduce the efficiency of the catalyst or oxidizing medium employed to bring the oxidation of $SO_2$ to $SO_3$. This purification has usually been carried out in a multiplicity of stages which include the cooling and drying of the purified sulphurous gases before admission to the contact chamber.

A primary object of the present invention is to simplify and cheapen the process of manufacture by eliminating some of these purifying and drying operations and the apparatus in which they are carried out.

The effect of the impurities on the catalyst may be said to be of two kinds; first a mechanical interference due to dust and suspended solid matter from the roaster which is deposited on the catalyst and reduces its effective area, and secondly a "poisoning" effect due to certain compounds such as those of arsenic or chlorine and various other substances. It has hitherto been necessary to remove both classes of destructive material in order to ensure the working of the contact process at a high stage of efficiency, and to do this it has been common practice to cool the roaster gas to a temperature such that the impurities are condensed and obtained in a form which facilitates their removal. In practice it is found that the cooling of the roaster gas causes the formation of an acid mist with which is generally associated a large proportion of the compounds which are condensed from the hot roaster gases in which they had been suspended as fine dust particles or united as vapours or gases.

The removal of the acid mist is therefore an important step in purification and frequently requires one or more important items of apparatus for its effective conduct. Under some conditions the substantially complete removal of the acid mist does not sufficiently cleanse the roaster gas and it may be necessary to wash out with the help of a chemical agent in a separate apparatus gaseous impurities which have not been completely associated with the acid mist.

Finally it has been found desirable for the continuous operation of the plant at high efficiency to remove as completely as possible all water vapour by drying the purified roaster gases in contact with strong sulphuric acid in one or more towers or other vessels.

Now the present invention envisages the use of a catalytic material which is substantially unaffected by the usual catalyst poisons thus enabling the conversion of sulphur dioxide to sulphur trioxide to be carried on continuously and efficiently without subjecting the roaster gases to the lengthy and expensive operations necessary for the removal of said poisons.

The present invention primarily consists in a process for the oxidation of sulphur dioxide to sulphur trioxide in the presence of oxygen comprising subjecting sulphurous gases such as the usual roaster gases to such treatment only as is necessary to remove dust and suspended solid matter and then pasing said gases in admixture with air or oxygen over a catalyst consisting of a chromium hydroxide hydrogel containing an adsorbed base. It is well known that certain catalytic elements such as chromium, vanadium, tungsten, uranium, tantalum, titanium and the like are substantially unaffected by substances which are poisons to platinum catalysts, and no claim is made herein to the use of chromium catalysts broadly.

The catalyst employed in accordance with the present invention is obtained by preparing chromium hydroxide in the form of a hydrogel, causing said hydrogel to adsorb one or more insoluble or slightly soluble bases such as calcium, magnesium, nickel, cobalt, manganese or zinc and then washing and drying the product which will generally be found to be a hard brittle solid showing a lustrous surface on fracture and which in thin layers is transparent. When this material is charged into a converter and a mixture of sulphur dioxide and air is passed over it at a temperature of about 500° C. the oxidation of sulphur dioxide to sulphur trioxide commences and progressively increases until a continuous high percentage conversion is obtained.

One method of preparation of the catalyst is as follows:—

A cold aqueous solution containing about ten percent by weight of a soluble chromium salt such for example as chromium nitrate or chloride is added in equivalent quantity, slowly, and with stirring, to a cold aqueous solution of caustic soda containing one part by weight of NaOH to two parts by weight of water, chromium hydroxide being precipitated in the form of a hydrogel. Precipitation may not begin until some time after the solutions have been mixed, and if the operation has been carried out without stirring, the chromium hydroxide may appear in the form of a jelly.

The precipitated hydrogel is preferably washed free from soluble salts and filtered, and the wet hydrogel is then mixed with a dilute solution of the acetate of one or more of the following bases:—calcium, magnesium, nickel, cobalt, manganese or zinc and is allowed to settle. After a short time the supernatent liquid is found to contain little or none of the base in solution, the base having been adsorbed to the chromium hydroxide hydrogel in such a manner that washing with water will not remove it therefrom. The material is then dried and heated in a current of air at a temperature of about 350° to 400° C., the product being a hard brittle solid, which if not already in the form of granules may be broken up and charged direct into the converter.

As mentioned above this catalyst is for all practical purposes unaffected by the usual catalyst poisons and sulphurous gases may be taken direct from a roaster to the converter for their oxidation to $SO_3$. It is desirable, however, to remove dust and suspended solid matter which would otherwise deposit on the catalyst and reduce its effective area. This dust removal may be effected in any known or suitable manner as by means of filters or electrostatic dust depositers, and the issuing gases still at high temperature, for instance in excess of 360° C., may be led without cooling, washing and drying direct into the converter.

According to the present invention there is employed as the catalyst or oxidizing medium the material described in pending application Serial No. 301,696 filed August 23rd, 1928, and the sulphurous gases obtained by roasting ores or other sulphur-bearing materials are subjected to a reduced purification treatment, and it may be only to such treatment as is necessary to remove dust or suspended matter which would otherwise deposit on the oxidizing medium, the gases being then subjected directly to oxidation. If desired the sulphurous gases from the roaster may be passed still at high temperature, e. g. in excess of 360° C. to electrostatic dust depositors and/or filters to remove sufficient of the dust to prevent its deposition on the catalyst, and then without complete cooling washing and drying may be led direct into the contact chamber containing the oxidizing medium aforesaid.

In this manner it is possible substantially to reduce the steps of the purification system and the process is carried on at a high oxidation efficiency for materially increased periods compared with the known catalysts.

What we claim is:—

1. The process of catalytically oxidizing sulphur dioxide which comprises subjecting sulphurous gases to such treatment only as is necessary to remove suspended solid matter and then passing said gases in the presence of oxygen over a catalyst comprising solid chromium hydroxide hydrogel containing at least one adsorbed base.

2. The process of catalytically oxidizing sulphur dioxide which comprises removing suspended solid matter from sulphurous roaster gases and then passing said gases in admixture with oxygen and still containing poisons for platinum catalysts over a catalyst comprising solid chromium hydroxide hydrogel containing at least one adsorbed base.

3. The process of catalytically oxidizing dioxide which comprises removing suspended solid matter from sulphurous gases and then passing said gases in admixture with oxygen over a catalyst comprising dry solid chromium hydroxide hydrogel containing at least one adsorbed slightly soluble base.

4. A process of catalytically oxidizing sulphur dioxide which comprises removing suspended solid matter from sulphurous roaster gases and then passing said gases at a temperature in excess of 360° C. in admixture with oxygen and containing poisons for platinum catalysts over a catalyst comprising dry solid chromium hydroxide hydrogel containing at least one adsorbed slightly soluble base.

STANLEY ROBSON.
BERTRAM LAMBERT.